United States Patent
Shi et al.

(10) Patent No.: US 8,994,690 B2
(45) Date of Patent: Mar. 31, 2015

(54) METHOD AND APPARATUSES OF TRANSPARENT FINGERPRINT IMAGER INTEGRATED WITH TOUCH DISPLAY DEVICE

(71) Applicants: Weidong Shi, Pearland, TX (US); Yang Lu, Pearland, TX (US)

(72) Inventors: Weidong Shi, Pearland, TX (US); Yang Lu, Pearland, TX (US)

( * ) Notice: Subject to any disclaimer, the term of this patent is extended or adjusted under 35 U.S.C. 154(b) by 154 days.

(21) Appl. No.: 13/757,993

(22) Filed: Feb. 4, 2013

(65) Prior Publication Data
US 2014/0218327 A1     Aug. 7, 2014

Related U.S. Application Data

(63) Continuation-in-part of application No. 13/459,207, filed on Apr. 29, 2012, and a continuation-in-part of application No. 13/667,235, filed on Nov. 2, 2012.

(51) Int. Cl.
*G06F 3/044*     (2006.01)
*G06F 3/041*     (2006.01)
*G06K 9/00*      (2006.01)

(52) U.S. Cl.
CPC .............. *G06F 3/044* (2013.01); *G06F 3/041* (2013.01); *G06K 9/00006* (2013.01)

USPC ........................................................ 345/174

(58) Field of Classification Search
USPC ........................................................ 345/174
See application file for complete search history.

(56) References Cited

U.S. PATENT DOCUMENTS

2012/0092293 A1*  4/2012  Ganapathi et al. ............ 345/174

* cited by examiner

*Primary Examiner* — Charles V Hicks

(57) ABSTRACT

The present invention describes a transparent fingerprint imaging apparatus wherein said apparatus comprises, a plurality of column lines, a plurality of scan lines, a plurality of data lines, and a plurality of fingerprint capacitance sensing cells wherein a fingerprint capacitance sensing cell further comprises, a fingerprint capacitor comprising a transparent capacitance detecting electrode and a transparent capacitance-detecting dielectric layer, a transparent reference capacitor coupled with said fingerprint capacitor with one electrode connecting to the fingerprint capacitor, and an amplification transparent TFT (thin-film transistor) wherein the gate electrode of the amplification transparent TFT connects to the transparent capacitance detecting electrode, one terminal of said amplification transparent TFT connects to a data line and the other terminal connects to a scan line.

20 Claims, 3 Drawing Sheets

METHOD AND APPARATUSES OF TRANSPARENT FINGERPRINT IMAGER INTEGRATED WITH TOUCH DISPLAY DEVICE

The present application is a continuation-in-part of U.S. application Ser. No. 13/459,207, entitled "Methods and Apparatus of Integrating Fingerprint Imagers with Touch Panels and Displays", filed Apr. 29, 2012; The present application is also a continuation-in-part of U.S. application Ser. No. 13/667,235, entitled "Methods and Apparatus for Managing Service Access Using a Touch-Display Device Integrated with Fingerprint Imager", filed Nov. 2, 2012. All of which are hereby incorporated by reference in their entireties.

BACKGROUND OF THE INVENTION

Field of the Invention

This invention relates to designing a biometric touch apparatus that comprises transparent fingerprint imagers for supporting identity management and/or access control.

BRIEF DESCRIPTION OF THE DRAWINGS

The invention may be better understood, and further advantages and uses thereof more readily apparent, when considered in view of the following detailed description of exemplary embodiments and examples, taken with the accompanying diagrams, in which.

Figure 1:
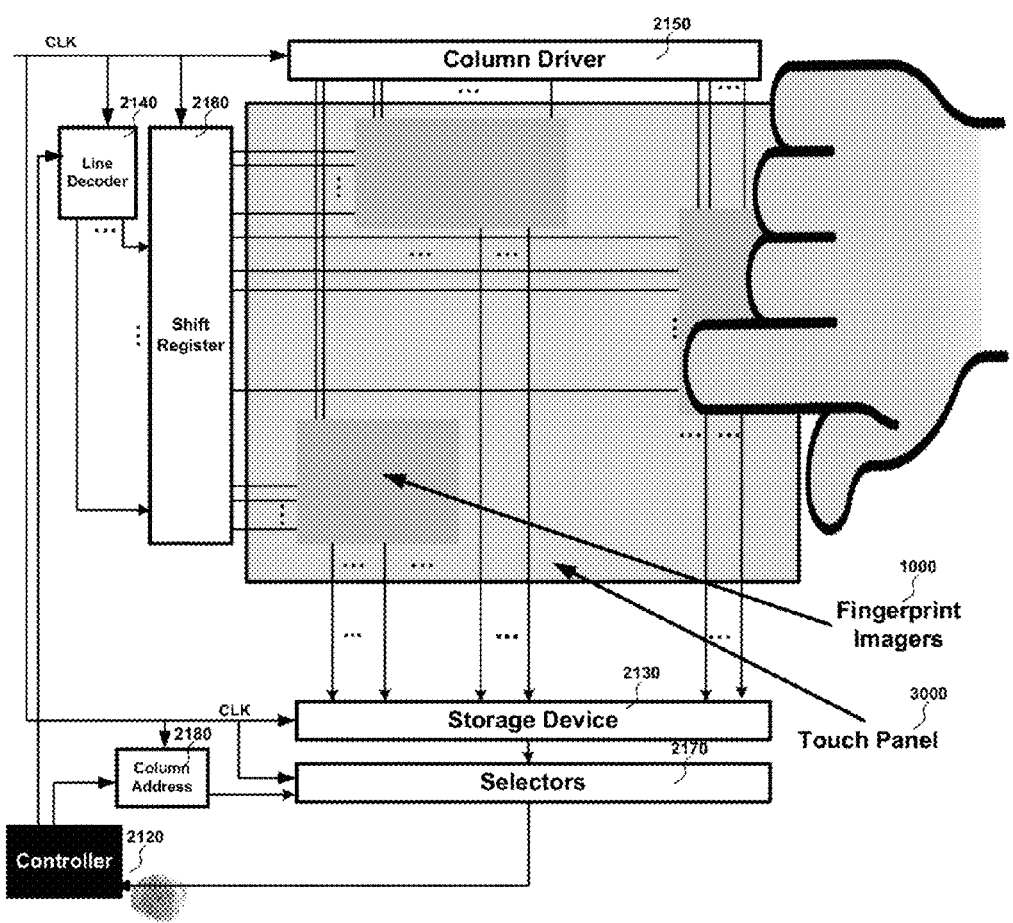
FIG. 1 is a block diagram showing, in one exemplary embodiment of the present invention, the components involved for implementing a biometric touch-display panel.

While the patent invention shall now be described with reference to the embodiments shown in the drawings, it should be understood that the intention is not to limit the invention only to the particular embodiments shown but rather to cover alterations, modifications and equivalent arrangements possible within the scope of appended claims. Throughout this discussion that follows, it should be understood that the terms are used in the functional sense and not exclusively with reference to specific embodiment, implementation, programming interface.

DETAILED DESCRIPTION OF THE PREFERRED EMBODIMENTS

Discussion in this section is intended to provide a brief description of some exemplary embodiments of the present invention.

FIG. 1 is a block diagram showing, in one exemplary embodiment of the present invention, the components involved for implementing a biometric touch-display panel.

A biometric touch-display panel can comprise multiple fingerprint imagers (1000) that are integrated with a touch panel (3000) (e.g., overlayed on top of a touch panel, beneath a touch panel, in-between a touch panel and a display, combined with a touch panel or a display panel, integrated together, hybrid device comprising fingerprint imagers and touch panel, hybrid device comprising fingerprint imagers and a touch-display panel). Depending on the implementation, a fingerprint imager can cover part of or complete area of a touch panel. A biometric touch-display apparatus can comprise at least one such biometric touch-display panel and use the biometric touch-display panel for collecting fingerprint data.

Furthermore, in an embodiment, a fingerprint imager can be TFT (thin-film transistors) based fingerprint imager. Each TFT fingerprint imager contains a matrix of fingerprint sensing cells, basic sensing unit of a fingerprint imager. The TFT fingerprint imagers (1000) can be transparent by using transparent electronic devices and fabrication processes.

In an additional embodiment, the touch panel can be integrated with an electronic display panel (e.g., OLED displays, liquid crystal display devices such as TFT-LCD, electronic paper display). Or in another embodiment, an electronic display panel can be placed beneath the touch panel.

The TFT fingerprint imagers (1000) are controlled by a fingerprint controller (2120). A fingerprint controller can select and activate a fingerprint imager according to predetermined conditions. In one embodiment, when a finger tip is inside the region covered by a fingerprint imager, its location can be recorded. Then the fingerprint controller can select and activate one or multiple fingerprint imagers to capture one or multiple fingerprints according to their locations.

The fingerprint imagers and fingerprint sensing cells can have their unique column addresses and line addresses. The fingerprint control can translate a touch panel location (e.g., position in touch panel X-axis or Y-axis) into a pair of fingerprint imager line address and/or column address. The line address decoder (2140) can decode a line address and send the decoded output to a shift register (e.g., parallel-in parallel-out shift register). The shift register (2160) can enable one row of fingerprint sensing cells at a time.

In one embodiment, the fingerprint sensing cells in the enabled row can be addressed during a clock cycle and disabled after results of the sensing cells are converted into digital values and fed into the storage devices (physical storage used to temporarily hold data such as latches, flip-flops, or buffers) that are situated at the end of a column (2130). Sensed results stored in the storage devices are selected and transmitted to the fingerprint controller.

For a fingerprint sensing cell, its output is transmitted over a data line. The signal can be amplified and then processed by a comparator.

In one embodiment, a fingerprint controller can compute a pair of column addresses (2180) as beginning and end column addresses by the column driver (2150). Results stored in the storage devices (2130) within the selected columns via the selector (2170) are transferred to the controller.

Figure 2:
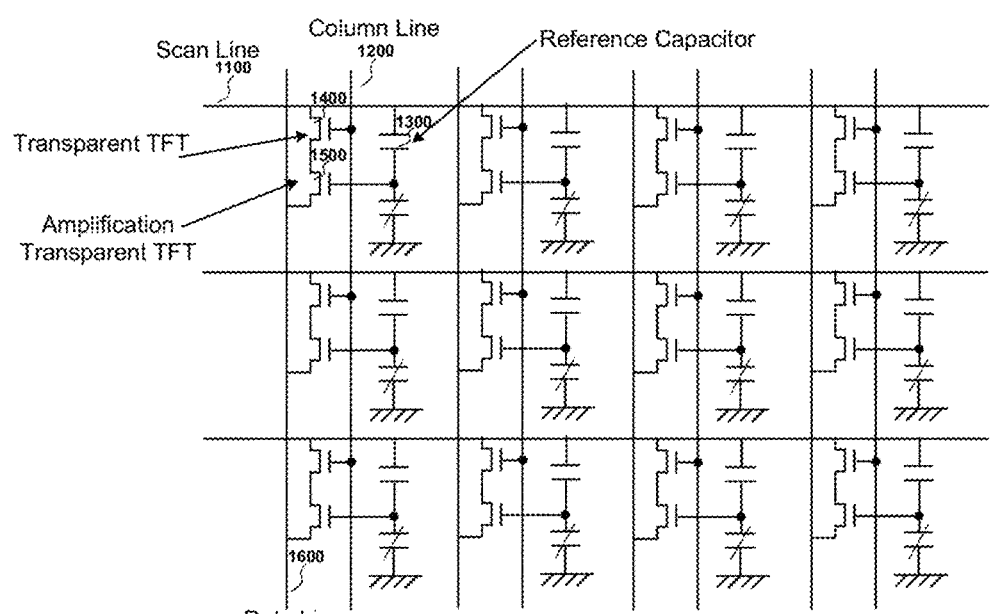
FIG. 2 is a block diagram showing, in one exemplary embodiment of the present invention, the components of a transparent capacitive fingerprint imager.

FIG. 2 is a block diagram showing, in one exemplary embodiment of the present invention, the components of a transparent capacitive fingerprint imager.

In accordance with the present invention, in one embodiment, a transparent capacitive fingerprint imager can comprise, a collection of scan lines (1100), column lines (1200), data lines, and a collection of fingerprint capacitance sensing cells. A fingerprint capacitance sensing cell connects to a data line, a scan line, and a column line. The scan lines can connect to the a shift register coupled with the fingerprint imager. The column lines connect to a column driver coupled with the fingerprint imager. Output signals from the data lines are amplified and converted into digital fingerprint data. The converted fingerprint data can be stored in an electronic storage device connects to the data lines of the fingerprint imagers.

In one embodiment, a fingerprint capacitance sensing cell can comprise, a transparent fingerprint capacitor, a transparent reference capacitor (1300), and two transparent TFTs (thin-film transistors). The transparent fingerprint capacitor comprises a transparent capacitance detecting electrode and a transparent capacitance-detecting dielectric layer. The fingerprint capacitor is connected to the reference capacitor (1300). One of the two electrodes of the reference capacitor is connected to the scan line. The other electrode is connected to the capacitance-detecting electrode.

When the scan line is set to be high in voltage (Vdd), the Vdd is applied to one electrode of the reference capacitor and shared between the reference capacitor and the fingerprint capacitor. Gate electrode of the amplification transparent TFT (1500) is connected to the capacitance-detecting electrode. In one embodiment, the gate potential of the amplification TFT changes in accordance with the surface contours of a fingerprint. One terminal electrode of the amplification TFT connects to a data line and the other terminal connects to a scan line. Gate electrode of the second transparent TFT (1400) connects to the column line. It is situated in between the scan line and the amplification transparent TFT. In one embodiment, the amplification TFT enters the on-state when a valley of a fingerprint is present over the capacitance-detecting dielectric layer. When a ridge of a fingerprint is in contact with the capacitance detecting dielectric layer, the amplification TFT enters the off-state.

It is worth to point out that the described embodiment is for illustration purpose. Equivalent embodiments of transparent fingerprint sensing cells using transparent electronic components may be readily apparent to those of ordinary skill in the art. The present invention should not be limited only to the described embodiments herein.

In accordance with the present invention, the transparent TFTs can be implemented using transparent organic thin-film transistors.

In alternative embodiments, the transparent TFTs can be implemented using transparent nanowire based thin-film transistors. Transparent nanowire based TFT includes but not limited to, transparent ZnO nanowire transistor, transparent $In_2O_3$ nanowire transistor, or transparent $SnO_2$ nanowire transistor.

An embodiment of the present invention can use any transparent thin-film transistors. The invention should not be limited only to transparent organic thin-film transistor or transparent nanowire based thin-film transistors.

In an embodiment, the transparent capacitance-detecting dielectric layer can be implemented using transparent conductive oxide film. In further embodiments, the column lines, scan lines, and data lines can also be implemented using transparent conducting films. Transparent conducting films (TCFs) are optically transparent and electrically conductive in thin layers. Transparent conducting films can be fabricated from either inorganic or organic materials.

Figure 3:
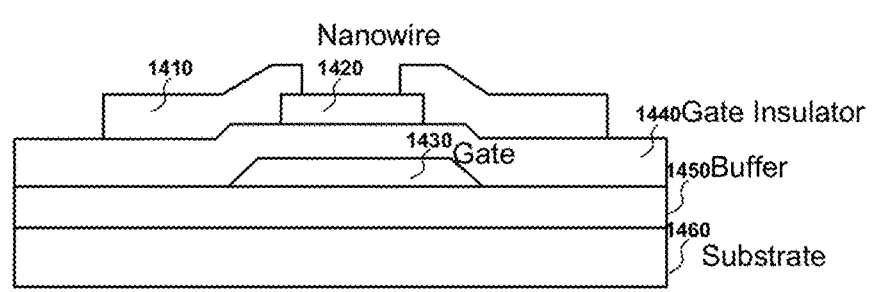
FIG. 3 is a block diagram showing, in one exemplary embodiment of the present invention, the components of a transparent nanowire based thin-film transistor.

FIG. 3 is a block diagram showing, in one exemplary embodiment of the present invention, the components of a transparent nanowire based thin-film transistor.

In one embodiment of the present invention, a transparent nanowire based thin-film transistor can comprise a substrate (1460), a buffer (1450), gate insulator (1440), a gate electrode (1430), a nanowire (1420) connecting a source and drain (1410). The nanowire (1420) can be a single nanowire or a nanowire network. In some embodiments, a transparent nanowire transistor can be implemented using Si, or Si/Ge, or ZnO, or $In_2O_3$, or $SnO_2$, or $Ge_1OXMnx$, or GaN, or other equivalent material.

In one embodiment, the buffer can be implemented using $SiO_2$ or equivalent material.

In one embodiment, the source and drain can be implemented using ITO or equivalent transparent conductive material.

In one embodiment, the gate electrode can be implemented using ITO or equivalent transparent conductive material.

Figure 4:
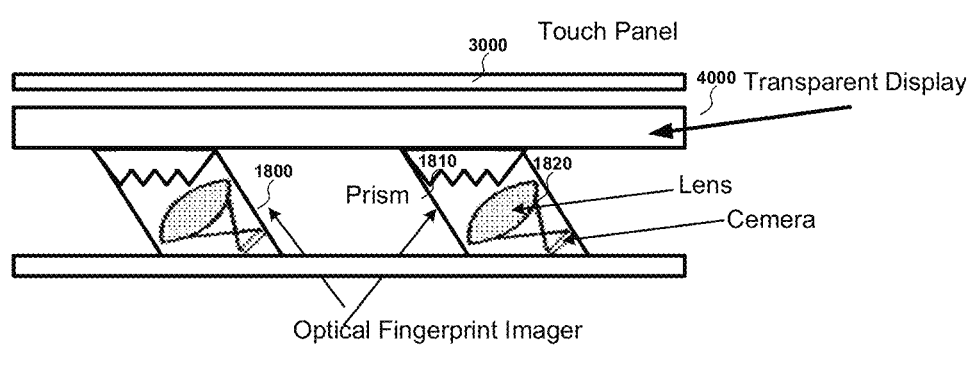
FIG. 4 is a block diagram showing, in one exemplary embodiment of the present invention, the structure of a biometric touch display apparatus comprising optical fingerprint imagers.

FIG. 4 is a block diagram showing, in one exemplary embodiment of the present invention, the structure of a biometric touch display apparatus comprising optical fingerprint imagers. The structure of fingerprint imager, display, and touch panel comprises three layers: a layer of optical fingerprint imagers, an electronic touch panel (3000) (e.g., capacitive touch panel, resistive touch panel, acoustic wave touch panel, infrared touch panel, projective capacitive touch panel), and a transparent electronic display (4000). The layer of optical fingerprint imagers can comprise a plurality of optical fingerprint imagers.

A transparent display is a device that can show information with transparent and/or flexible surfaces (e.g. plastics). A transparent display can be made using transparent components (e.g., transparent organic light-emitting diode). A transparent electronic device can be fabricated using transparent electronic process.

A touch panel is a device that can detect the presence and location of a touch (e.g., capacitive touch panel, resistive touch panel, acoustic wave touch panel, infrared touch panel, projective capacitive touch panel, etc).

In one embodiment, the touch panel and display can be integrated as an in-cell touch-display panel. An in-cell touch-display panel is a device that integrates the touch panel with an electronic display panel. Manufacturers have developed in-cell touch panels, integrating the production of capacitive sensor arrays in the OLED (e.g., AMOLED, POLED) module fabrication process. The fingerprint imager layer is on the top of the structure and comprises at least one or a plurality of fingerprint imagers; and the in-cell touch-display panel is at the bottom of the structure.

In one embodiment, the touch panel (3000) is on the top of the structure; the transparent display (4000) is in the middle of the structure; and the fingerprint imager layer is at the bottom of the structure with one or a plurality of optical fingerprint imagers (1800).

In one embodiment, an optical fingerprint imager can comprise, a prism (1810), a lens (1820), and a camera (1830) (e.g., CMOS camera). The camera can take fingerprint images of a finger that touches the biometric touch display apparatus.

In one embodiment, the electronic touch panel is situated between the electronic display and the optical fingerprint layer.

In alternative embodiments, the electronic display is situated between the electronic touch panel and the optical fingerprint layer.

Figure 5:
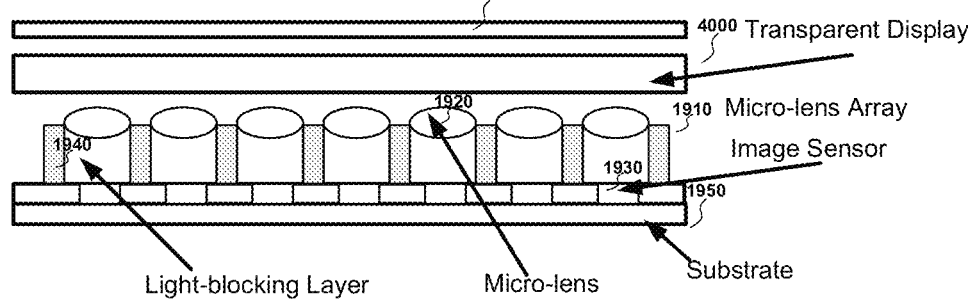
FIG. 5 is a block diagram showing, in one exemplary embodiment of the present invention, the structure of a biometric touch display apparatus comprising optical fingerprint imagers implemented using micro-lens.

FIG. 5 is a block diagram showing, in one exemplary embodiment of the present invention, the structure of a biometric touch display apparatus comprising optical fingerprint imagers implemented using micro-lens. The structure of fingerprint imager, display, and touch panel comprises three layers: a layer of optical fingerprint imagers implemented using micro-lens and image sensors, an electronic touch panel (e.g., capacitive touch panel, resistive touch panel, acoustic wave touch panel, infrared touch panel, projective capacitive touch panel), and a transparent electronic display (e.g., transparent OLED). The layer of optical fingerprint imagers can comprise a plurality of optical fingerprint imagers.

In one embodiment, an optical fingerprint imager can comprise, a micro-lens array (1910) comprising a collection of micro-lens (1920), and a plurality of image sensors (1930) coupled with the micro-lens array. A light blocking layer (1940) can be situated between the micro-lens array and the image sensors. In additional embodiments, an image sensor can comprise a CMOS sensor. Fingerprint images can pass through the micro-lens array and be captured by the image sensors. Furthermore, there can be a substrate (1950).

In one embodiment, the electronic touch panel is situated between the electronic display and the optical fingerprint layer.

In an alternative embodiment, the electronic display is situated between the electronic touch panel and the optical fingerprint layer.

In an alternative embodiment, the touch panel and display can be integrated as an in-cell touch-display panel.

It should be understood that there exists implementations of other variations and modifications of the invention and its various aspects, as may be readily apparent to those of ordinary skill in the art, and that the invention is not limited by the specific embodiments described herein.

What is claimed is:

1. A transparent fingerprint imaging apparatus comprises, a plurality of column lines wherein each column line is coupled with a collection of fingerprint capacitance sensing cells;
    a plurality of scan lines wherein each scan line is coupled with a collection of fingerprint capacitance sensing cells;
    a plurality of data lines wherein each data line is coupled with a collection of fingerprint capacitance sensing cells; and
    a plurality of fingerprint capacitance sensing cells wherein each fingerprint capacitance sensing cell further comprises, a fingerprint capacitor comprising a transparent capacitance detecting electrode and a transparent capacitance detecting dielectric layer, a transparent reference capacitor coupled with said fingerprint capacitor with one electrode connecting to the fingerprint capacitor, a transparent TFT (thin-film transistor) wherein said transparent TFT with one terminal connecting to a scan line and another terminal connecting to a column line, and an amplification transparent TFT (thin-film transistor) wherein the gate electrode of the amplification transparent TFT connects to the transparent capacitance detecting electrode, one terminal of said amplification transparent TFT connects to a data line and the other terminal connects to a scan line.

2. The apparatus in claim 1 wherein the transparent TFT is a transparent nanowire based TFT.

3. The apparatus in claim 2 wherein the transparent nanowire based TFT is a ZnO nanowire transistor.

4. The apparatus in claim 2 wherein the transparent nanowire based TFT is a In2O3 nanowire transistor.

5. The apparatus in claim 2 wherein the transparent nanowire based TFT is a SnO2 nanowire transistor.

6. The apparatus in claim 1 wherein the transparent TFT is a transparent organic thin-film transistor.

7. The apparatus in claim 1 wherein the transparent capacitance-detecting dielectric layer comprises a transparent conductive oxide film.

8. The apparatus in claim 1 wherein the column line comprises a transparent conducting film.

9. The apparatus in claim 1 wherein the scan line comprises a transparent conducting film.

10. The apparatus in claim 1 wherein the data line comprises a transparent conducting film.

11. The apparatus in claim 1 further comprises a collection of amplifiers wherein an amplifier connects to a data line.

12. The apparatus in claim 11 further comprises a collection of comparators coupled with the amplifiers.

13. A fingerprint biometric touch display apparatus comprises, an electronic touch panel wherein said touch panel can sense touch position of one human finger or multiple human fingers;
    a transparent electronic display wherein said transparent electronic display can display visual output;
    an optical fingerprint imaging layer wherein said optical fingerprint imaging layer comprises a plurality of optical fingerprint imagers.

14. The apparatus in claim 13 wherein the optical fingerprint imager further comprises, a prism, a lens, and a camera.

15. The apparatus in claim 13 wherein the optical fingerprint imager further comprises, a micro-lens array, and a plurality of image sensors coupled with the micro-lens array.

16. The apparatus in claim 13 wherein the electronic touch panel is situated between the electronic display and the optical fingerprint imaging layer.

17. The apparatus in claim 13 wherein the electronic display is situated between the electronic touch panel and the optical fingerprint imaging layer.

18. The apparatus in claim 13 wherein the electronic touch panel is integrated with the electronic display.

19. A fingerprint biometric touch display apparatus comprises,
    a transparent electronic display wherein said transparent electronic display can display visual output;
    a fingerprint sensing layer wherein said fingerprint sensing layer comprises one or a plurality of transparent capacitive fingerprint imagers wherein said fingerprint imager further comprises a plurality of fingerprint capacitance sensing cells wherein a fingerprint capacitance sensing cell connects to a data line, a scan line, and a column line, a driving element coupled with the fingerprint imagers wherein said driving element further comprises a scan line shift register coupled with the fingerprint imager scan lines and a column driver coupled with the fingerprint imager column lines, an electronic storage device coupled with the fingerprint imagers wherein said electronic storage device connects to the data lines of the fingerprint imagers; and an electronic touch sensing layer wherein said touch sensing layer can sense touch position of one human finger or multiple human fingers.

20. The apparatus in claim 19 wherein the transparent capacitive fingerprint imager further comprises,
    a plurality of column lines wherein each column line is coupled with a collection of fingerprint capacitance sensing cells;
    a plurality of scan lines wherein each scan line is coupled with a collection of fingerprint capacitance sensing cells;
    a plurality of data lines wherein each data line is coupled with a collection of fingerprint capacitance sensing cells; and
    a plurality of fingerprint capacitance sensing cells wherein each fingerprint capacitance sensing cell further comprises, a fingerprint capacitor comprising a transparent capacitance detecting electrode and a transparent capacitance detecting dielectric layer, a transparent reference capacitor coupled with said fingerprint capacitor with one electrode connecting to the fingerprint capacitor, a transparent TFT (thin-film transistor) wherein said transparent TFT with one terminal connecting to a scan line and another terminal connecting to a column line, and an amplification transparent TFT (thin-film transistor) wherein the gate electrode of the amplification transparent TFT connects to the transparent capacitance detecting electrode, one terminal of said amplification transparent TFT connects to a data line and the other terminal connects to a scan line.

* * * * *